May 6, 1952  B. H. CHAPIN  2,595,927
GLASS SETTING DEVICE
Filed Feb. 3, 1947  2 SHEETS—SHEET 1
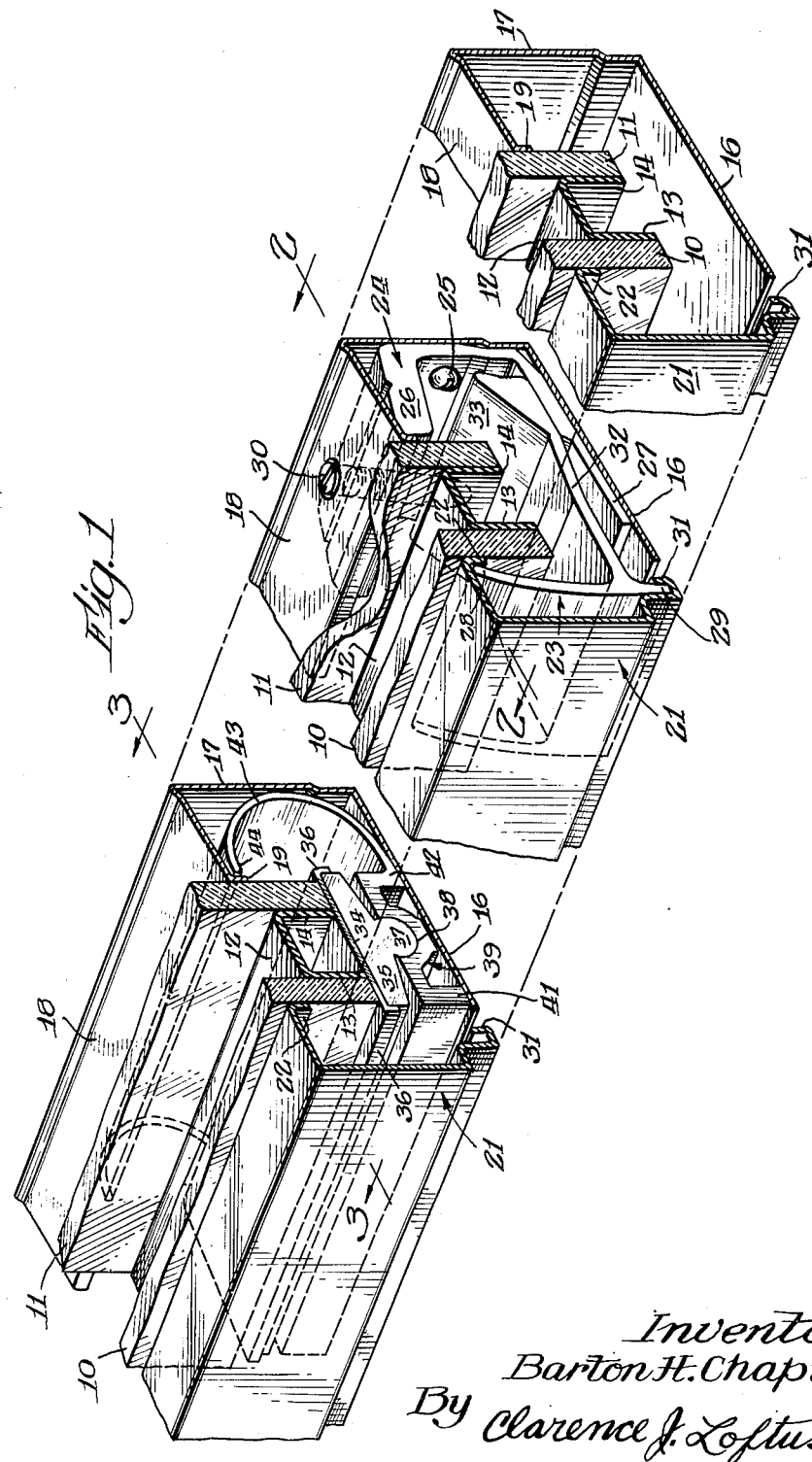
Inventor:
Barton H. Chapin
By Clarence J. Loftus atty.

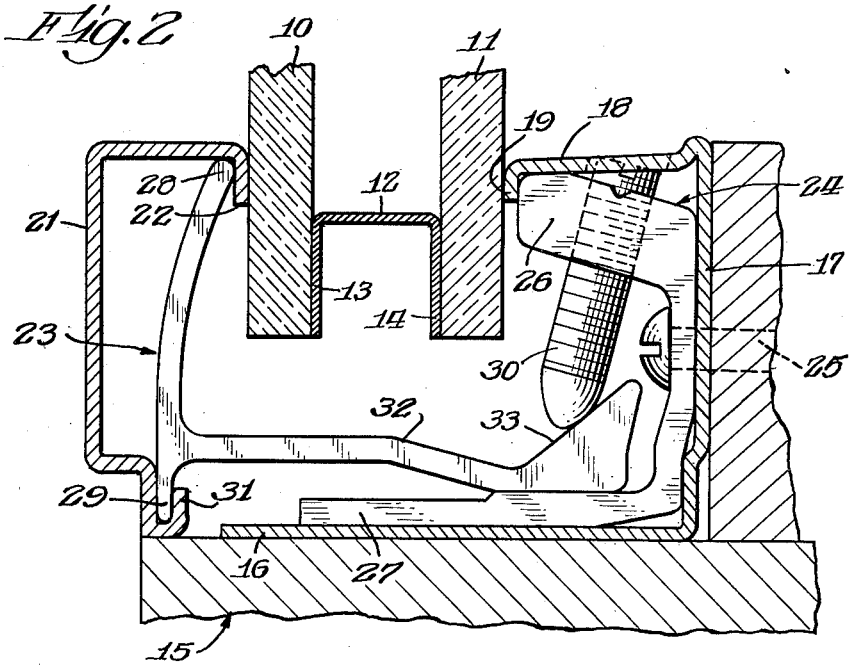
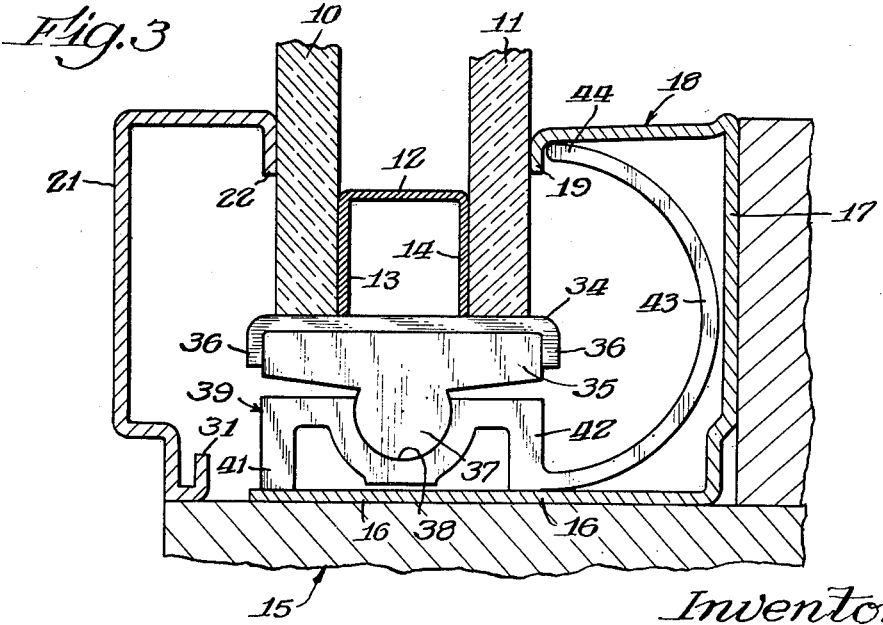

Patented May 6, 1952

2,595,927

UNITED STATES PATENT OFFICE 2,595,927

GLASS SETTING DEVICE

Barton H. Chapin, Niles, Mich., assignor to The Kawneer Company, Niles, Mich., a corporation of Michigan Application February 3, 1947, Serial No. 726,035

14 Claims. (Cl. 20—56.5)

This invention relates to plural paned sealed windows and to glass setting devices therefor, and more specifically to an improved glass setting particularly adapted to use for supporting sealed plural paned window units. The term sealed plural pane window units as used here refers particularly to plate glass store fronts or windows consisting of two or more panes of glass having their marginal edges bonded to a filler and sealed, to provide a dead air space between the individual panes. An assembly of this type is much more effective as a thermal insulator than a single pane, so that windows are not apt to become clouded by condensation of moisture on their surfaces under any normal conditions of humidity and temperature.

These plural pane window units per se are very old. However, although the broad idea of providing a pair of glass plates with a sealed air space between, has long been known, it has been found that in use the individual panes comprising the unit are submitted to varying and unequal strains and loads, both in placing the unit in its setting and during use after being installed, due to settling or shifting of the front of the building and other causes. Any varying strains on the individual panes naturally causes relative movement between their sealed surfaces and breaks the seal, and the inevitable result of a defective seal is that dirt and moisture find their way into the air between the panes, so that the insulating properties of the unit are reduced and the interior surfaces of the glass become dirty and clouded. Obviously, this renders a window unit useless since the interior surfaces cannot be reached for washing.

This is particularly troublesome with modern types of sealed window units now manufactured commercially, since these are not sealed at the time of installation but are factory made, and of such construction that repair is impractical, so that a unit is useless once the seal is broken. Present commercial units consist of two or more panes of glass in which the inside marginal edges of the panes have been coated by an extremely thin metal layer, firmly imbedded in and bonded to the glass surface. The panes are spaced from each other by a metal filler and soldered along the full length of their marginal edges, to effect a complete seal around the entire unit. The filler is then pierced, the air inside of the unit pumped through dehydrating apparatus, and the openings in the filler soldered shut so that the moisture content in the air space between the panes is so low that no condensation will take place on the interior surfaces. Also, since the interior surfaces of each pane are cleaned prior to assembly and any dust or foreign matter is removed from the air during dehydrating, there is no possibility of any dirt being deposited on the interior surfaces of the unit unless the seal is broken.

From the foregoing it will be seen that a sealed window unit of this type has extremely great possibilities in that it provides effective thermal insulation and yet gives a clear and unclouded view even under adverse conditions of temperature and humidity. However, these units are naturally quite expensive to manufacture and repair is impractical once the seal is broken, since the defect will not be discovered until the interior surfaces of the glass show dirt or clouding, and it is then impossible to clean these surfaces. This gives rise to serious problems in mounting or setting the units, particularly in large store fronts wherein units of large area and corresponding great weight are to be mounted, or in any installation where strains are apt to be imposed in the glass, since if conventional glass setting devices are used the tendency of the panes to move with respect to each other may loosen the metal from the surfaces of the glass.

It is therefore the principal object of the present invention to provide an improved setting for sealed window units adapted to automatically equalize the load between the plural plates or panes, or to compensate for unequal vertical strains or loads imposed on the panes, to prevent rupture of the bond between the filler and the individual panes of glass.

A further object of the invention resides in the provision of an improved setting for sealed window units having the characteristics indicated and including means for positioning a setting block with respect to the panes so that it will be properly spaced and properly aligned.

A further object of the invention resides in the provision of a plural paned window comprising a sealed unit of parallel glass plates with setting devices including an improved setting block as indicated together with an inner and outer sash member designed to completely enclose the setting block and cooperate with it in maintaining the sealed unit of the window in position.

The structural details by which the objects of this invention are accomplished are illustrated in the drawings attached to and forming a part of the present specification in which:

Figure 1 is a perspective view of a lower sash assembly, the parts being broken in section to show the improved setting block of this invention and the means for maintaining the inner and outer parts of the sash in assembled position.

Figure 2 is a detail sectional view through the lower sash assembly and is taken substantially on the plane of the line 2—2 in Figure 1.

Figure 3 is a detail sectional view of the lower sash assembly taken substantially on the plane of the line 3—3 in Figure 1.

The sealed window assembly disclosed herein includes a parallel paned window unit which consists of a pair of separate plate glass panes 10 and 11 spaced from each other by a filler in the form of a metal channel strip 12 having side flanges 13 and 14 bonded to the interior surfaces of the panes 10 and 11. The unit is mounted in the window opening of a wall 15 by an inner sash member having a broad base flange 16, a vertical wall 17, and a gutter portion 18 terminating in a downwardly extending gutter flange 19 bearing directly on the inner surface of the pane 11. A channel shaped outer sash member 21 is secured on the outer side of the window unit and includes a downwardly extending flange 22 bearing directly on the outer surface of the pane 10. The outer sash member is secured in position by a number of brackets 23 spaced along the length of the inner sash member and secured to brackets 24 positioned within the sash and against the vertical wall 17, and secured to the building wall by means of the screws 25. Each of the brackets 24 includes a head portion 26 snapped under the flange 19 of the gutter and a foot portion 27 extending outwardly below the panes 10 and 11 and resting on the base flange 16 of the inner sash member. Each of the brackets 23 is secured to the outer sash member 21 by an upper flange 28 which is positioned immediately behind the flange 22 and a lower flange 29 interlocked with the flange 31. The brackets 23 include arms 32 extending inwardly below the panes 10 and 11 and terminating in head portions having inclined clamping surfaces 33, so that tightening of the round pointed adjusting screws 30 extending downwardly from threaded openings in the head 26 of the bracket 24 will shift the brackets bodily to draw the outer sash member 21 inwardly against the outer surface of the pane 10.

The setting blocks are preferably mounted in pairs to support the window unit, each block being placed below the unit and about one-fourth of its length from the corner. The lower edges of the panes 10 and 11 are directly supported on a lead pad 34 covering the upper surface of the setting block 35. The pad may have a pair of downwardly extending flanges 36 to maintain it in position on the block. The setting blocks are of a width at least equivalent to the overall thickness of the sealed window unit to provide a broad upper surface extending under and supporting both panes of glass. They may be any desired length. The lower surface of the block 35 is formed to include a longitudinally extending journal 37. The journal is generally cylindrical in form and has its axis on the center line of the block 35. The journal is supported in a longitudinal bearing groove 38 in a base seat 39, which includes a pair of legs 41 and 42 spaced apart from each other and resting on the upper surface of the base flange 16 of the inner sash member.

The seat is provided with means to position itself with respect to the inner sash member and outer sash member so that the bearing 38 will lie exactly in line with the plane of the window and equidistant between the exterior surfaces of the panes 10 and 11. This is done by the upwardly extending semi-circular arm 43 which is shaped so that its upper end 44 may be hooked under the flange 19 of the gutter to limit its outward movement, while the midpoint of the arm lies closely adjacent the vertical wall 17 of the inner sash member so that inward movement of the block is also limited. The seat 39 is positioned in the inner sash member by merely hooking the end 44 of the arm 43 under the flange 18 and then swinging the part downwardly against the upper surface of the base flange 16.

It will be seen that the journal 37 and bearing 38 form a fulcrum lying on the exact center between the panes 10 and 11, so that the block 35 may tilt toward either side to automatically equalize or compensate for unequal vertical strains or loads imposed on the plate glass panes 10 and 11 to which they are subjected during and after installation and while in use, due to the weight of the panes 10 and 11. Further, it will be noted that the load will be perfectly equalized even though the edges of the panes are not exactly even and true, since the block 35 will tilt to balance one against the other and relieve any strain on the bond between the individual panes and the filler. The tiltable nature of the seating block not only accomplishes a perfect equalization on the load on the individual panes at the time of original installation, but also is capable of compensating for factors that might later develop to cause temporary or permanent inequalities in loading. Thus even though the panes may be flexed almost to the breaking point by wind or external forces, the block 35 will shift to maintain the load perfectly equalized. Similarly, any unequal expansion of the panes 10 and 11 due to temperature differentials on the opposite sides of the window will be compensated for. The unequal settling of the entire wall or angular shifting or settling of the supporting frame work of the store front and unequal strains or loads imposed thereby upon the plate glass panes is automatically equalized and compensated for, since it can only tilt the base seat 39 and will leave the setting block 35 undisturbed.

It will also be seen that the combination of the setting block, the base seat, face moulding and the sash channel provide means for accurately positioning the journal and its bearing at the exact center line of the window unit and in exact alignment with the plane of the window, so that perfect equalization is attained without the necessity for individual adjustment and so that the desirable features of the invention disclosed in this application may be utilized with inner and outer sash members of conventional types.

From the foregoing it will be apparent that the teachings of the present invention provide a window construction having means for equalizing the load between the individual panes of a sealed glass window unit so that each of the individual panes of glass is individually supported, and any tendency to strain the bond between the panes and their spacing fillers is minimized. This greatly enlarges the field of usefulness of window units of this character, since it reduces the difficulties of original installation and guards against failure of the unit in operation.

The exact form of the invention illustrated in the drawings and described in this specification is the present commercial embodiment of these teachings and is believed to be well illustrative of the inventive thought involved. It is recognized, however, that certain variations of mechanical design are feasible without sacrifice of all of the advantages inherent in this disclosure and it is accordingly pointed out that the scope of the invention extends to any modification or variation coming within the terms of the appended claims.

Having thus described the invention, what I claim as new and desire to protect by United States Letters Patent is:

1. A setting for mounting a plural-paned sealed window unit equalizing and compensating for unequal strain imposed upon the panes and preventing the disruption of the bond between said panes, comprising in combination, at least one setting block having a broad upper surface extending under and supporting each of the individual panes of glass; the setting block having relatively soft surfaces providing a seat for and supporting the edges of the individual glass panes: with a shiftable mounting for said setting block including a fulcrum consisting of a longitudinal journal centered on the lower surface of the setting block, the journal having its axis parallel with the surfaces of the panes and being positioned at the midpoint between the opposite panes, and a base seat having a longitudinal bearing groove receiving and supporting the journal of the setting block.

2. In a strain equalizing setting for mounting a plural paned sealed window unit to prevent disruption of the bond between the panes, the combination of an inner sash member having a glass engaging surface bearing against the inner marginal edge of the inside pane and an outer sash member having a glass engaging surface bearing against the outer marginal edge of the outside pane, at least one glass setting block having a broad surface extending between the edges of the spaced-apart panes and supporting each of the individual panes thereon, the setting block having relatively soft surfaces providing seats receiving the edges of the individual glass panes, with a shiftable mounting for said setting block including a fulcrum consisting of a longitudinal journal centered on the lower surface of the setting block, the journal having its axis parallel with the surfaces of the panes and being positioned midway between the opposite panes, a base seat supporting the setting block and having a longitudinal bearing groove receiving the journal of said setting block, with means affixed to the base seat extending to and engaging the inner sash member and securing the base seat with its bearing groove parallel with the surfaces of the panes and positioned midway between the opposite panes.

3. In a strain equalizing setting for mounting a parallel paned sealed window unit to prevent disruption of the bond between the panes, the combination of an inner sash member having a glass engaging surface bearing against the inner marginal edge of the inside pane and an outer sash member having a glass engaging surface bearing against the outer marginal edge of the outside pane, at least one glass setting block having relatively soft surfaces providing seats receiving the edges of the individual glass panes, with a shiftable mounting for said setting block including a fulcrum having its axis parallel with the surfaces of the panes, with means engaging the inner sash member and positioning said setting block midway between the opposite panes.

4. A window construction comprising, in combination, a sealed unit consisting of at least two individual panes of glass spaced from each other by a marginal filler and bonded to said filler along their marginal edges; an inner sash member extending longitudinally along the lower edge of the panes and bearing against the inner surface of the inside pane; an outer sash member extending longitudinally along the lower edge of the outside pane and bearing against the outer surface of the outside pane; together with at least one setting block housed within the inner sash member and having relatively soft surfaces engaging the edges of the glass and independently supporting the edges of the individual glass panes; with a shiftable mounting for said setting block including a fulcrum on the setting block, and a base seat supporting the said fulcrum and setting block, with means affixed to the base seat engaging the inner sash member and securing the base seat in fixed position with respect to the panes, said means including an inwardly and upwardly extending arm having its upper end engaging the inner sash member and limiting outward movement of the base seat, and another portion of the arm engaging the inner sash member and limiting its inward movement with respect thereto.

5. A window construction comprising, in combination, a sealed unit consisting of at least two individual panes of glass spaced from each other by a marginal filler and bonded to said filler along their marginal edges; an inner sash member extending longitudinally along the lower edge of the panes and bearing against the inner surface of the inside pane; an outer sash member extending longitudinally along the lower edge of the outside pane and bearing against the outer surface of the outside pane; together with at least one setting block housed within the inner sash member and independently supporting the edges of the individual glass panes; with a shiftable mounting for said setting block supported by a base seat with means affixed to the base seat engaging the inner sash member and locating the journal and bearing of the base seat at the center of thickness of the panes; said means including an inwardly and upwardly extending arm having its upper end engaging the inner sash member and limiting outward movement of the base seat, and another portion of the arm engaging the inner sash member and limiting its inward movement with respect thereto.

6. A window construction comprising, in combination, a sealed unit consisting of at least two individual panes of glass spaced from each other by a marginal filler and bonded to said filler along their marginal edges; an inner sash member extending longitudinally along the lower edge of the panes and bearing against the inner surface of the inside pane; an outer sash member extending longitudinally along the lower edge of the outside pane and bearing against the outer surface of the outside pane; together with at least one setting block housed within the inner sash member and having relatively soft surfaces engaging the edges of the glass and independently supporting the edges of the individual glass panes; with a shiftable mounting for said setting block including a fulcrum on the setting block, and a base seat supporting the said fulcrum and setting block, with means affixed to the base seat engaging the inner sash member and securing the base seat in fixed position with respect to the panes.

7. In a glass setting device supporting a plurality of individual panes of glass spaced apart from each other and bonded to a filler at their marginal edges, the combination of a base seat with a longitudinal bearing for a horizontal journal and a setting block including a journal seated in the bearing of the base seat and permitting relative tilting movement between the setting block and the base seat.

8. In a glass setting device supporting a plurality of individual panes of glass spaced apart from each other and bonded to a filler at their marginal edges, the combination of a setting block supporting the lower edges of the panes, a tiltable mounting supporting the setting block, and a longitudinal fulcrum between said setting block and said tiltable mounting.

9. In a glass setting device supporting a plurality of individual panes of glass spaced apart from each other and bonded to a filler at their marginal edges, the combination of a setting block having surfaces directly contacting the lower edge of each pane and supporting each pane of glass individually, a base seat below the setting block and supporting the weight of all of the panes, and means equalizing the load on the individual panes independently of tilting movements of the base seat.

10. In a glass setting device supporting a plurality of individual panes of glass spaced apart from each other and bonded to a filler at their marginal edges, the combination of a setting block supporting the lower edges of the panes and a tiltable mounting carrying the setting block including a fulcrum supporting the setting block and positioned between the planes of the inside and outside panes of the glass.

11. A window construction comprising, in combination, a sealed unit consisting of at least two individual panes of glass spaced from each other by a marginal filler and bonded to said filler along their marginal edges; an inner sash member extending longitudinally along the lower edge of the panes and bearing against the inner surface of the inside pane; an outer sash member extending longitudinally along the lower edge of the outside pane and bearing against the outer surface of the outside pane; together with at least one setting block housed within the inner sash member and having a broad upper surface extending under and supporting each of the individual panes of glass; the setting block having relatively soft surfaces engaging the edges of the glass and providing seats separately and independently supporting the edges of the individual glass panes; with a shiftable mounting for said setting block including a fulcrum consisting of a longitudinal journal centered on the lower surface of the setting block, the journal having its axis parallel with the surfaces of the panes and positioned at the midpoint between the opposite panes; a base seat having a longitudinal bearing groove receiving and supporting the journal of the setting block, with means affixed to the base seat engaging the inner sash member and locating the journal and bearing of the base seat at the center of thickness of the panes.

12. A glass setting device of the character described, adapted to be mounted between inner and outer glass retaining members comprising in combination a two-part equalizing setting block having an upper and lower section, the upper section mounted to rock on the lower section, the lower section being provided with means for centering the setting block with respect to the glass supported thereon for automatically equalizing strains imposed upon the glass.

13. A glass setting device of the character described, adapted to be mounted between inner and outer glass retaining members comprising in combination a two-part equalizing setting block having an upper and lower section, the upper section mounted to rock on the lower section, the lower section being provided with means for centering the setting block with respect to the glass supported thereon for automatically equalizing strains imposed upon the glass, said means for centering said setting block consisting of an arm extending inwardly and upwardly from said setting block and engaging the inner glass retaining member, and restraining said setting block against inward or outward movement with respect thereto.

14. In a glass setting device supporting a plurality of individual panes of glass spaced apart from each other and bonded to a filler at their marginal edges, the setting device including the combination of a base seat with a bearing extending longitudinally with respect to the bottom edge of the panes and a setting block including a journal extending in the same direction and seated in the bearing of the base seat and permitting relative movement between the setting block and the base seat.

BARTON H. CHAPIN.

REFERENCES CITED

The following references are of record in the file of this patent:

UNITED STATES PATENTS

| Number | Name | Date |
|---|---|---|
| 1,138,499 | Murnane | May 4, 1915 |
| 1,320,288 | Stewart | Oct. 28, 1919 |
| 1,833,364 | Katz | Nov. 24, 1931 |
| 2,032,344 | Barrows et al. | Mar. 3, 1936 |
| 2,103,732 | Lowry | Dec. 28, 1937 |
| 2,460,391 | Miller | Feb. 1, 1949 |